(12) United States Patent
DeCusatis et al.

(10) Patent No.: US 9,906,451 B2
(45) Date of Patent: Feb. 27, 2018

(54) SOFTWARE-DEFINED NETWORKING PHYSICAL CONTROLLER

(71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 14/501,356

(22) Filed: Sep. 30, 2014

(65) Prior Publication Data

US 2015/0172195 A1 Jun. 18, 2015

Related U.S. Application Data

(63) Continuation of application No. 14/104,768, filed on Dec. 12, 2013.

(51) Int. Cl.
| | |
|---|---|
| *H04L 12/50* | (2006.01) |
| *H04L 12/801* | (2013.01) |
| *H04L 12/721* | (2013.01) |
| *H04L 12/24* | (2006.01) |
| *H04J 14/02* | (2006.01) |

(52) U.S. Cl.
CPC ........ *H04L 47/10* (2013.01); *H04J 14/0269* (2013.01); *H04L 41/0853* (2013.01); *H04L 45/38* (2013.01); *H04L 47/18* (2013.01)

(58) Field of Classification Search
CPC ........ H04L 47/18; H04L 47/12; H04L 47/30; H04L 47/27; H04L 47/11
USPC ........................................... 370/231
See application file for complete search history.

(56) References Cited

U.S. PATENT DOCUMENTS

| | | |
|---|---|---|
| 5,889,846 A | 3/1999 | Ricciardi |
| 6,535,313 B1 | 3/2003 | Fatehi et al. |
| 8,456,984 B2 | 6/2013 | Ranganathan |
| 8,693,374 B1 | 4/2014 | Murphy et al. |

(Continued)

FOREIGN PATENT DOCUMENTS

| | | |
|---|---|---|
| CN | 102540985 A | 7/2012 |
| CN | 103051629 A | 4/2013 |

(Continued)

OTHER PUBLICATIONS

McKeown, N., "Software-defined Networking", http://klamath.stanford.edu/~nickm/talks/infocom_brazil_2009_v1-1.pdf, INFOCOM keynote talk, Apr. 2009, 64 pages.

(Continued)

*Primary Examiner* — Andrew Chriss
*Assistant Examiner* — Atique Ahmed
(74) *Attorney, Agent, or Firm* — Cantor Colburn LLP; Steven Chiu

(57) ABSTRACT

Embodiments include a method, system, and computer program product for managing data flows in a network. A software-defined network controller obtains one or more attributes associated with one or more devices, such as physical layer devices. The obtained attribute(s) are stored in a table. A flow of data in the network is controlled based on the table.

20 Claims, 3 Drawing Sheets

(56) References Cited

U.S. PATENT DOCUMENTS

| | | | |
|---|---|---|---|
| 8,942,557 B2 | 1/2015 | Hussain et al. | |
| 9,038,151 B1 | 5/2015 | Chua et al. | |
| 9,148,223 B2 | 9/2015 | Blair | |
| 9,225,614 B2 | 12/2015 | Koley | |
| 2004/0156313 A1* | 8/2004 | Hofmeister | H04L 12/4633 370/229 |
| 2008/0181203 A1 | 7/2008 | Jones | |
| 2010/0014431 A1 | 1/2010 | Bajpay et al. | |
| 2013/0058215 A1* | 3/2013 | Koponen | H04L 12/4633 370/241 |
| 2013/0259465 A1 | 10/2013 | Blair | |
| 2013/0318243 A1* | 11/2013 | Chinthalapati | H04L 45/52 709/226 |
| 2014/0099119 A1* | 4/2014 | Wei | H04J 14/0257 398/79 |
| 2014/0119367 A1* | 5/2014 | Han | H04L 12/4633 370/389 |
| 2014/0169158 A1 | 6/2014 | Mishra et al. | |
| 2014/0169788 A1 | 6/2014 | Hussain et al. | |
| 2014/0185450 A1 | 7/2014 | Luo et al. | |
| 2014/0226985 A1 | 8/2014 | Patel et al. | |
| 2014/0229630 A1 | 8/2014 | Narayanan et al. | |
| 2014/0280838 A1* | 9/2014 | Finn | H04L 49/00 709/223 |
| 2014/0308037 A1 | 10/2014 | Hu et al. | |
| 2014/0321849 A1 | 10/2014 | Katagiri | |
| 2014/0334814 A1 | 11/2014 | Ji et al. | |
| 2014/0334819 A1 | 11/2014 | Mehrvar et al. | |
| 2015/0026313 A1* | 1/2015 | Chawla | H04L 47/24 709/220 |
| 2015/0026794 A1* | 1/2015 | Zuk | H04L 63/0227 726/13 |
| 2015/0029846 A1* | 1/2015 | Liou | H04L 47/122 370/230.1 |
| 2015/0104172 A1 | 4/2015 | Wang | |
| 2015/0117850 A1 | 4/2015 | Prakash | |
| 2015/0127805 A1 | 5/2015 | Htay et al. | |
| 2015/0131666 A1 | 5/2015 | Kang | |
| 2015/0131989 A1 | 5/2015 | Syed | |
| 2015/0147060 A1 | 5/2015 | Patel | |
| 2015/0172192 A1* | 6/2015 | Decusatis | H04L 47/10 709/223 |
| 2015/0372986 A1 | 12/2015 | Fountain | |
| 2015/0381493 A1* | 12/2015 | Bansal | H04L 45/30 370/392 |
| 2016/0043996 A1* | 2/2016 | Syed Mohamed | H04L 63/20 726/1 |
| 2016/0073278 A1 | 3/2016 | Roessler | |
| 2016/0149816 A1* | 5/2016 | Wu | H04L 45/245 370/235 |

FOREIGN PATENT DOCUMENTS

| | | |
|---|---|---|
| CN | 103338163 A | 10/2013 |
| CN | 103347013 A | 10/2013 |
| CN | 104704759 A | 6/2015 |
| EP | 2487844 A1 | 8/2012 |
| WO | 2014166758 A1 | 10/2014 |

OTHER PUBLICATIONS

Channegowda et al., "Experimental demonstration of an OpenFlow based software-defined optical network employing packet, flexed and flexible DWDM grid technologies on an international multinational domain testbed", Mar. 11, 2013, Optics Express, pp. 1-12.

Gringeri et al., "Extending Software Defined Network Principles to Include Optical Transport", Mar. 2013, IEEE Communications Magazine.

Ji, "Software Defined Optical Network", Nov. 28, 2012, 2012 11th International Conference on Optical Communications and Networks.

Yang et al., "Experimental Demonstration of Time-aware Software Defined Networking for OpenFlow-based Optical Interconnect in Intra-Datacenter Networks", Dec. 9, 2013, Globecom 2013 Workshop-Cloud Computing Systems, Networks, and Applications.

Zhang et al., "Dynamic Traffic Grooming in Elastic Optical Networks", Jan. 2013, vol. 31, No. 1, IEEE Journal on Selected Areas in Communication.

Chen et al., "Software Defined Networking across Distributed Datacenters over Cloud", Dec. 2, 2013, IEEE 5th International Conference Cloud Computing Technology and Science (vol. 1), pp. 615-622.

Kuroki et al., "Scalable OpenFlow Controller Redundancy Tackling Local and Global Recoveries", Aug. 25, 2013, The Fifth International Conference on Advances in Future Internet, pp. 61-66.

Sanchez et al., "Using Transparent WDM Metro Rings to Provide an Out-of-Band Control Network for OpenFlow in MAN", Jun. 23, 2013, Transparent Optical Networks (ICTON), 2013 15th International Conference, pp. 1-4.

Chinese Office Action of CN201410687132.6, dated Dec. 30, 2016, 11 pages.

Choi et al., "Demonstration of BER-Adaptive WSON Employing Flexible Transmitter/Receiver With an Extended OpenFlow-Based Control Plane", IEEE Photonics Technology Letters, Vo. 25, No. 2, Jan. 15, 2013.

Cvijetic et al., "SDN and OpenFlow for Dynamic Flex-Grid Optical Access and Aggregation Networks", Jul. 30, 2011.

Das, "Unifying Packet and Circuit Switched Networks with OpenFlow", Dec. 2009, Stanford University.

DeCusatic, "Towards an Open Data Center with an Interoperable Network (OdIN) vol. 3: Software Defined Networking and OpenFlow", May 2012, IBM.

Gudla, "Experimental Demonstation of OpenFlow Control of Packet and Circuit Switches", 2010.

Liu et al., "Open Slice: an OpenFlow-based Control Plane for Spectrum Sliced Elastic Optical Path Neworks", 2012 38th European and Exhibition Conference on Optical Communications, Sep. 2012, IEEE.

Liu et al., "OpenFlow-based Wavelength Path Control in Transparent Optical Networks: a Proof-of-Concept Demonstration", 2011 37th European Conference and Exhibition on Optical Communication, Sep. 2011, IEEE Publishing.

Mo, "Quality of Transmission Awareness in Converged Electronic and Optical Networks with OpenFlow", May 2013, IEEE Communications, vol. 17, No. 5.

Nejabati et al., "Optical Network Virtualization (Invited)", 2011 15th International Conference on Optical Network Design and Modeling (ONDM).

Oliveira et al., "Experimental Testbed of Reconfigurable Flexgrid Optical Network with Virtualized GMPL Control Plane and Autonomic Controls Toward SDN", Aug. 2013, 2013 SMBO/IEEE MTT-S International Microwave and Opteolectronics Conference (IMOC), IEEE.

ONF, (Open Networking Foundation), "Open Flow Switch Specification: version 1.4.0", Oct. 14, 2013.

Pan, et al., "Optical Performance monitoring for the next generation optical communication networks", Nov. 2009, Optical Fiber Technology.

Siqueira et al., "An Optical SDN Controller for Transport Network Visualization and Autonomic Operation", Dec. 9, 2013, Globecom 2013, IEEE.

Zhang, et al., "Experimental Demonstration of OBS/WSON Multi-Layer Optical Switched Networks with an OpenFlow based Unified Control Plane", 2012 16th International Conference on Optical Network Design and Modeling, Apr. 2012, IEEE.

Zhao et al., "Data Center Optical Networks (DCON) with Open Flow based Software Defined Networking (SDN)", 2013 8th International Conference on Communications and Networking in China (CHINACOM), Aug. 2013, IEEE Publishing.

* cited by examiner

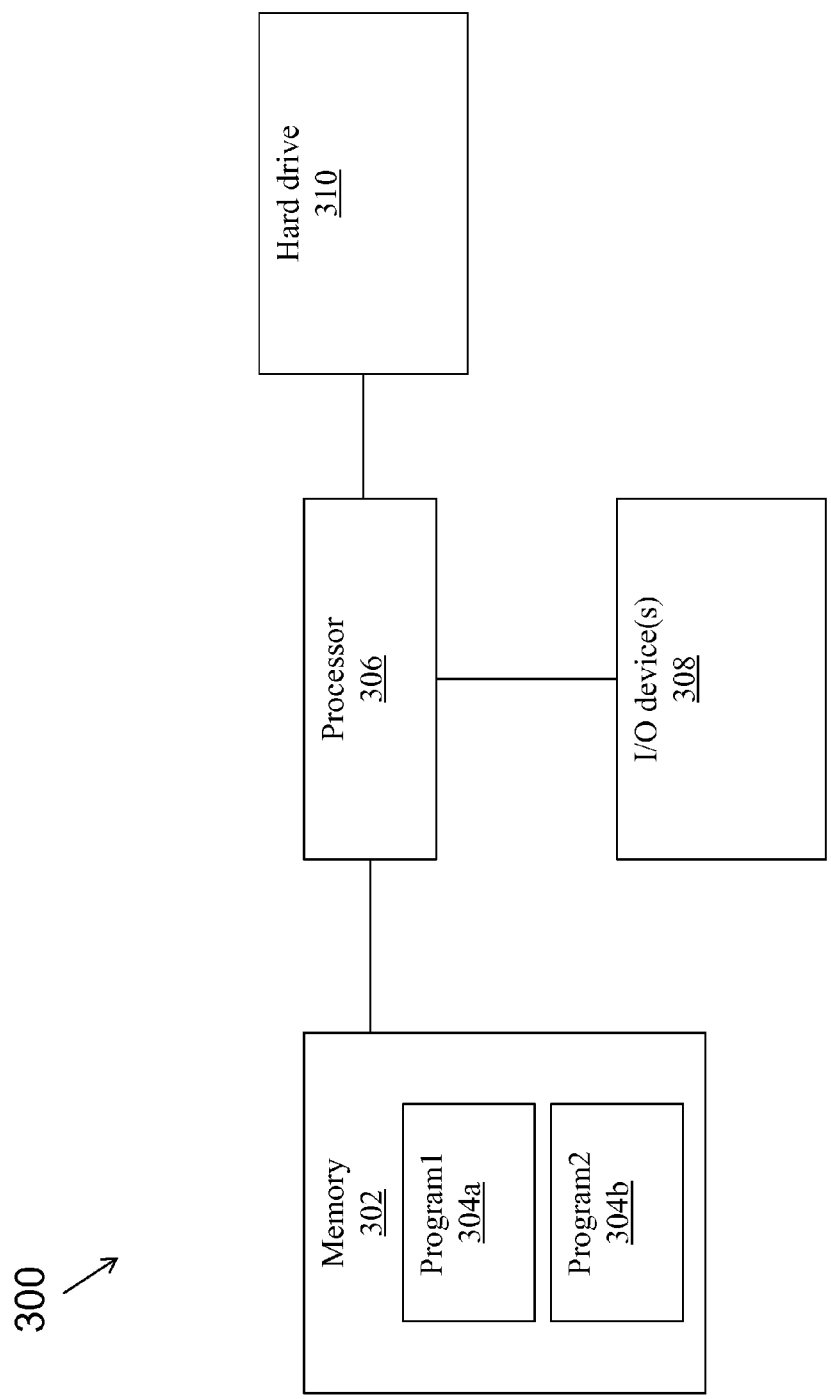

SOFTWARE-DEFINED NETWORKING PHYSICAL CONTROLLER

DOMESTIC PRIORITY

This application is a continuation of U.S. patent application Ser. No. 14/104,768, filed Dec. 12, 2013, the disclosure of which is incorporated by reference herein in its entirety.

BACKGROUND

The present invention relates generally to computing technology, and more specifically, to software-defined networking (SDN).

SDN represents one technique for controlling networks. In the context of the Open System Interconnection (OSI) model (ISO/IEC 7498-1), SDN is applied to Layer 2 or 3 devices, such as switches, routers, etc. SDN is not applied to Layer 1 or physical layer (PHY) devices.

In conventional systems, PHY devices each have their own operating system (OS). The PHY devices need to be separately configured. Moreover, in the context of the network as a whole, SDN fails to provide for management of all the devices in the network, or all the devices in a given communication path. In this respect, there is no end-to-end management provided.

SUMMARY

Embodiments include a method, system, and computer program product for managing data flows in a network. A software-defined network controller obtains one or more attributes associated with one or more devices, such as physical layer devices. The obtained attribute(s) are stored in a table. A flow of data in the network is controlled based on the table.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a computing system environment in accordance with an embodiment.

DETAILED DESCRIPTION

In accordance with one or more embodiments, systems, apparatuses, and methods are described that provide a software-defined network(ing) (SDN) controller configured to manage physical layer (PHY) devices. The controller couples to the PHY devices via a secure channel. The controller obtains attributes associated with the PHY devices in order to provide data flow control and load balancing. End-to-end management of all the devices in the network and all the communication in the network is provided.

Figure 1:
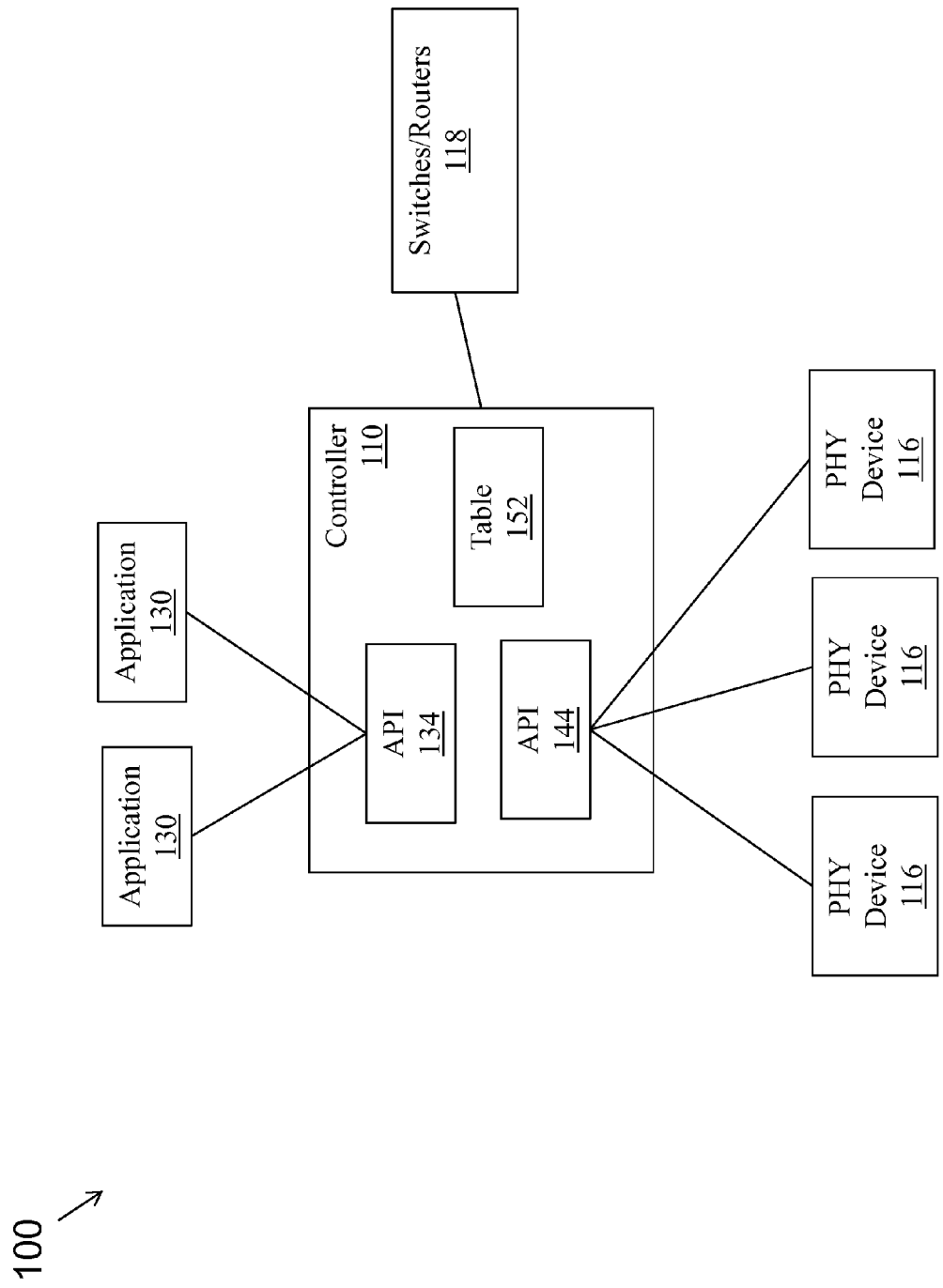
FIG. 1 depicts a computing system environment in accordance with an embodiment.

Turning now to FIG. 1, a computing system 100 is generally shown. The system 100 may be associated with one or more networks, such as a data network, a management network, etc. The networks may be coupled to one another.

The system 100 may include one or more controllers, such as a SDN controller 110. The controller 110 may interface with or connect to one or more PHY devices 116. The connection between the controller 110 and the PHY devices 116 may be made using a secure, encrypted channel or medium. In an embodiment, the PHY devices 116 may include one or more of wavelength-division multiplexing (WDM) enabled devices, switch inter-switch links (ISLs), cross connects, optical amplifiers, electronic dispersion compensation systems, etc.

In some embodiments, the controller 110 may reside on a server, such as an x86 server. The controller 110 may interface with or connect to Layer 2 and 3 Ethernet ports (not shown in FIG. 1). In some embodiments, the controller 110 may be used to provision or control, e.g., switches or routers 118. The controller 110 (or server) may connect to the switches or routers 118 through a secure or encrypted link.

The controller 110 may interface with, or connect to, one or more applications 130. In an embodiment, the applications 130 may include one or more of load balancers, bandwidth monitors, and wavelength controllers. The applications 130 may execute on one or more computing devices, such as one or more servers.

The controller 110 may include a (northbound) application programming interface (API) 134 that interfaces with the applications 130. The API 134 may be used to collect physical device attribute information used in switch/WDM provisioning.

The controller 110 may include a (southbound) API 144 that interfaces to the PHY devices 116. The API 144 may be used to query device attributes, populate a table 152 in the controller 110 with that attribute information, and communicate traffic flow controls to each PHY device 116.

In some embodiments, the table 152 may be populated by device attribute information collected by one or both of the APIs 134, 144. Based on the attributes in the table 152, the controller 110 may configure the PHY devices 116 and select optimal reconfigurable traffic flow paths through the PHY devices 116 in response to service requests by the applications 130.

Any number of attributes may be stored in the table 152. Device attributes that may be provided by the table 152 include, for a WDM device: the number of wavelength channels supported, a maximum data rate for each wavelength, whether or not the wavelength supports time-division multiplexing (TDM) (and if so, how many channels of TDM are supported and at what rate), whether a channel is characterized by high availability (using a protection switch), and whether or not the channel has a pre-amp or post-amp attached. In the context of an optical amplifier, the inclusion or value of a gain may be included in the table 152. In some embodiments, the number or types of attributes stored in the table 152 may be based on the type of PHY devices 116 present, the manufacturer of the PHY devices 116, and/or a make or model number for a PHY device 116.

As described above, the table 152 may be used by the controller to select an optimal traffic flow in a network. For example, an incoming frame received on a port of a PHY device 116 may be compared to a specification or table of different types of frames and action(s) to take based on receipt of those respective frames. In this respect, the incoming frame may serve as an index to the table, and the action(s) to take in response to the receipt of that incoming frame may be selected from the table. Considering the system 100 as a whole, the controller 110 may be used to facilitate end-to-end control or management of an entire network.

In terms of providing an optimal traffic flow in a network, the controller 110 may cause one or more data flows to be virtualized with respect to a resource or device (e.g., a PHY device 116). Virtualization may entail the use of a physical medium (e.g., a cable or channel) by more than one entity or device (e.g., one or more servers). In a first embodiment, the physical medium may be shared using a TDM technique. In a second embodiment, the entity or device serving as the source of data packets to be conveyed on the physical medium may encapsulate the data packets with a header. The header may include one or more addresses, such as one or more virtual addresses. The header may be examined by the controller 110 for making decisions regarding data flows in the network. The use of headers may be associated with tunneling techniques as would be known to one of skill in the art.

While a single controller 110 is shown in FIG. 1, in some embodiments more than one controller 110 may be used. For example, control or management functionality may be shared across or between more than one controller 110. In some embodiments, a first controller 110 may serve as a primary controller, and a second controller 110 may be enabled or activated in the event that the first controller 110 fails. In some embodiments, a controller 110 may provide load balancing.

In some embodiments, the system 100 (e.g., the controller 110) may be associated with an out-of-band management network for purposes of, e.g., PHY device 116 control or maintenance. Communication in the management network may adhere to an open industry standard or may be based on a proprietary communication technique or algorithm.

The system 100 of FIG. 1 is illustrative. In some embodiments, the entities of the system 100 may be organized or arranged in a manner that is different from what is shown. In some embodiments, one or more of the entities shown may be optional. In some embodiments, additional entities not shown may be included.

Figure 2:
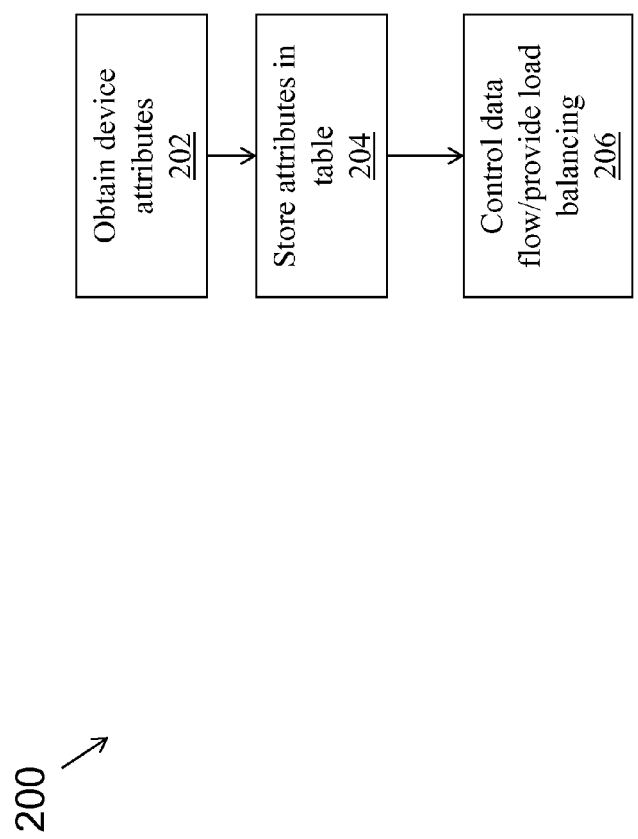
FIG. 2 depicts a process flow of a method in accordance with an embodiment.

Turning to FIG. 2, a flow chart of a method 200 is shown. The method 200 may be tied to, one or more systems, devices, or components, such as those described herein. For example, the method 200 may be executed by the controller 110. The method 200 may be used to provide for data flow control and load balancing in a network.

In block 202, one or more attributes associated with a device (e.g., a PHY device) may be obtained. The attributes may relate to the operation or use of the device. The attributes may be obtained based on a polling algorithm or technique.

In block 204, the attributes obtained in block 202 may be stored in a table. The attributes may be used to map incoming data packets or frames to one or more actions. In this respect, the table may be referred to as a match action table.

In block 206, data flow within the network may be controlled, and load balancing may be provided for, based on the attributes stored in the table in block 204. For example, upon receipt of an incoming data packet or data frame on a port (e.g., port #3) of a PHY device, the controller 110 may obtain an indication of the receipt of the data packet/frame, and the incoming data packet/frame may serve as an index to the table of block 204. Having knowledge of the attributes associated with the PHY device, the controller 110 may select an output port (e.g., port #12) of the PHY device for routing the data packet/frame.

The method 200 is illustrative. In some embodiments, one or more of the blocks, or a portion thereof, may be optional. In some embodiments, additional blocks or operations not shown may be included. In some embodiments, the blocks may execute in an order or sequence that is different from what is shown in FIG. 2.

Referring to FIG. 3, an exemplary computing system 300 is shown. The system 300 is shown as including a memory 302. The memory 302 may store executable instructions. The executable instructions may be stored or organized in any manner and at any level of abstraction, such as in connection with one or more applications, processes, routines, methods, etc. As an example, at least a portion of the instructions are shown in FIG. 3 as being associated with a first program 304a and a second program 304b.

The instructions stored in the memory 302 may be executed by one or more processors, such as a processor 306. The processor 306 may be coupled to one or more input/output (I/O) devices 308. In some embodiments, the I/O device(s) 308 may include one or more of a keyboard or keypad, a touchscreen or touch panel, a display screen, a microphone, a speaker, a mouse, a button, a remote control, a joystick, a printer, etc. The I/O device(s) 308 may be configured to provide an interface to allow a user to interact with the system 300.

The processor 306 may include one or more hard drives 310. The hard drives 310 may be used to store data.

The system 300 is illustrative. In some embodiments, one or more of the entities may be optional. In some embodiments, additional entities not shown may be included. For example, in some embodiments the system 300 may be associated with one or more networks. In some embodiments, the entities may be arranged or organized in a manner different from what is shown in FIG. 3. In some embodiments, at least a portion of the system 300 may be associated with a computing device, such as a controller or a server.

Technical effects and benefits include an ability to extend concepts associated with SDN to PHY devices. End-to-end management may be provided by a controller. Such end-to-end management may include management of all the devices in a network, such as servers, switches, routers, PHY devices, etc. Data flows associated with the devices may be controlled based on attributes associated with the devices, thereby providing for optimal data flow in the network.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM).—Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for managing data flows in a network, the method comprising:
   obtaining, by a software-defined network controller, attributes associated with at least one physical layer device among a plurality of physical layer devices, the attributes obtained from the at least one physical layer device by at least one application programming interface (API) in response to a query generated by the at least one API to the at least one physical layer device to receive the attributes, wherein the attributes being at least one device attribute among a plurality of device attributes comprising a plurality of supported wavelength channels, a maximum data rate for each wavelength, wavelength time-division multiplexing (TDM) support capability, a number of supported channels of TDM, channel availability, channel amplification, optical amplifier gain, a type of the devices present, a manufacturer of the devices, and model of the device;
   storing, by the controller, attributes in a table; and
   retrieving, by the controller, the attributes, in relation to at least one corresponding device among the plurality of devices, based on a received incoming data frame that is utilized as an index to the table; and
   controlling, by the controller, a flow of data including the incoming data frame in the network based on the table, wherein controlling the flow of data includes selecting an output port that outputs data to the at least one corresponding device based on the attributes, and virtualizing at least one data flow with respect to at least one of the physical layer devices to generate an optimal reconfigurable traffic flow path through at least one of the physical layer devices, and wherein the software-defined network controller is installed on a separate server and in signal communication with the at least one physical layer device via an encrypted communications link so as to obtain the attributes from the at least one device and control the data flow based on the attributes to balance a data load of the network, the encrypted communication link is established between a first endpoint of a first application programming interface (API) that interfaces with at least one application, and a second endpoint of a second API that interfaces with the at least one physical layer device, the physical layer device including at least one of a wavelength-division multiplexing (WDM) enabled device, an optical amplifier, and an electronic dispersion compensation system.

2. The method of claim 1, wherein the controller and the physical layer device are coupled to one another via a secure channel.

3. The method of claim 1, wherein the controller comprises an application programming interface that couples to the physical layer device.

4. The method of claim 1, further comprising:
polling, by the controller, the physical layer device to obtain the attributes.

5. The method of claim 1, wherein controlling the flow of data further comprises:
receiving, by the controller, an indication that the physical layer device receives an incoming data frame; and
selecting, by the controller, an action associated with the flow of data in the network based on the incoming data frame and the attributes in the table.

6. The method of claim 5, wherein the action comprises causing, by the controller, the incoming data frame to be routed to an output port of the physical layer device.

7. The method of claim 1, wherein the controller controls the flow of data in the network based on a virtual flow.

8. The method of claim 7, wherein the virtual flow is based on a sharing of a physical medium using a time-division multiplexing technique.

9. The method of claim 7, wherein the virtual flow is based on a use of data packets encapsulated with a header, the data packets conveyed on a physical medium.

10. The method of claim 1, wherein the controller controls the flow of data in the network using an out-of-band management network.

11. The method of claim 1, further comprising:
providing, by the controller, load balancing in the network based on the table.

12. A computer program product for managing data flows in a network, the computer program product comprising:
a non-transitory tangible storage medium readable by a processing circuit and storing instructions for execution by the processing circuit for performing a method comprising:
obtaining, by a software-defined network controller, attributes associated with at least one physical layer device among a plurality of physical layer devices, the attributes obtained from the at least one physical layer device by at least one application programming interface (API) in response to a query generated by the at least one API to the at least one physical layer device to receive the attributes, wherein the attributes being at least one device attribute among a plurality of device attributes comprising a plurality of supported wavelength channels, a maximum data rate for each wavelength, wavelength time-division multiplexing (TDM) support capability, a number of supported channels of TDM, channel availability, channel amplification, optical amplifier gain, a type of the devices present, a manufacturer of the devices, and model of the device;
storing, by the controller, the attributes obtained by the at least one API in a table; and
retrieving the attributes, in relation to at least one corresponding device among the plurality of devices, based on a received incoming data frame that is utilized as an index to the table; and
controlling, by the controller, a flow of data including the incoming data frame in the network based on the table, wherein controlling the flow of data includes selecting an output port that outputs data to the at least one corresponding device based on the attributes, and virtualizing at least one data flow with respect to at least one of the physical layer devices to generate an optimal reconfigurable traffic flow path through at least one of the physical layer devices, and
wherein the software-defined network controller is installed on a separate server and in signal communication with the at least one physical layer device via an encrypted communications link so as to obtain the attributes from the at least one device and control the data flow based on the at least one attribute to balance a data load of the network, the encrypted communication link is established between a first endpoint of a first application programming interface (API) among the at least API that interfaces with at least one application, and a second endpoint of a second API among the at least one API that interfaces with the at least one physical layer device, the physical layer device including at least one of a wavelength-division multiplexing (WDM) enabled device, an optical amplifier, and an electronic dispersion compensation system.

13. The computer program product of claim 12, wherein the controller and the physical layer device are coupled to one another via an encrypted channel.

14. The computer program product of claim 12, wherein the controller comprises an application programming interface that couples to the physical layer device.

15. The computer program product of claim 12, wherein the method performed by the processing circuit further comprises:
polling, by the controller, the physical layer device to obtain the attributes.

16. The computer program product of claim 12, wherein the method performed by the processing circuit further comprises:
receiving, by the controller, an indication that the physical layer device receives an incoming data frame; and
selecting, by the controller, an action associated with the flow of data in the network based on the incoming data frame and the attributes in the table.

17. The computer program product of claim 16, wherein the action comprises causing, by the controller, the incoming data frame to be routed to an output port of the physical layer device.

18. The computer program product of claim 12, wherein the controller controls the flow of data in the network based on a virtual flow.

19. The method of claim 1, wherein the optimal reconfigurable traffic flow path is selected based on the attributes stored in the table in response to a service request by the at least one application.

20. The computer program product of claim 12, wherein the optimal reconfigurable traffic flow path is selected based on the attributes stored in the table in response to a service request by the at least one application.

\* \* \* \* \*